US007987674B2

(12) United States Patent
Jones et al.

(10) Patent No.: US 7,987,674 B2
(45) Date of Patent: Aug. 2, 2011

(54) PHASE CHANGE MATERIAL THERMAL POWER GENERATOR

(75) Inventors: Jack A. Jones, Los Angeles, CA (US); Yi Chao, Pasadena, CA (US); Thomas I. Valdez, Covina, CA (US)

(73) Assignee: California Institute of Technology, Pasadena, CA (US)

( * ) Notice: Subject to any disclaimer, the term of this patent is extended or adjusted under 35 U.S.C. 154(b) by 619 days.

(21) Appl. No.: 12/113,882

(22) Filed: May 1, 2008

(65) Prior Publication Data

US 2009/0013691 A1      Jan. 15, 2009

Related U.S. Application Data

(60) Provisional application No. 60/928,364, filed on May 9, 2007, provisional application No. 60/998,656, filed on Oct. 12, 2007.

(51) Int. Cl.
*F03G 7/04* (2006.01)
(52) U.S. Cl. ............... 60/641.7; 60/530; 60/531
(58) Field of Classification Search ............. 60/527–531
See application file for complete search history.

(56) References Cited

U.S. PATENT DOCUMENTS

| 3,648,458 | A | * | 3/1972 | McAlister | 60/415 |
|---|---|---|---|---|---|
| 3,901,033 | A | * | 8/1975 | McAlister | 60/516 |
| 3,953,973 | A | * | 5/1976 | Cheng et al. | 60/671 |
| 4,341,075 | A | * | 7/1982 | Backlund | 60/531 |
| 5,291,847 | A | | 3/1994 | Webb | |
| 5,513,494 | A | | 5/1996 | Flynn et al. | |
| 5,579,640 | A | * | 12/1996 | Gray et al. | 60/413 |
| 6,807,856 | B1 | | 10/2004 | Webb | |
| 7,096,814 | B1 | | 8/2006 | Webb | |
| 7,353,768 | B1 | | 4/2008 | Jones et al. | |
| 2003/0167998 | A1 | | 9/2003 | Huntsman | |

FOREIGN PATENT DOCUMENTS

JP   2006-316649   11/2006

OTHER PUBLICATIONS

Jack A. Jones, et al. presented "Novel Thermal Powered Technology for the UUV Persistent Surveillance" at "A Presentation to the ONR Joint Review at Unmanned Systems Technology Development" in Panama City, Florida on Feb. 10, 2006.
PCT International Search Report for PCT/US2008/062301 filed on May 9, 2007 in the name of California Institute of Technology.
PCT International Written Opinion for PCT/US2008/062301 filed on May 9, 2007 in the name of California Institute of Technology.

* cited by examiner

*Primary Examiner* — Hoang M Nguyen
(74) *Attorney, Agent, or Firm* — Steinfl & Bruno LLP

(57) ABSTRACT

An energy producing device, for example a submersible vehicle for descending or ascending to different depths within water or ocean, is disclosed. The vehicle comprises a temperature-responsive material to which a hydraulic fluid is associated. A pressurized storage compartment stores the fluid as soon as the temperature-responsive material changes density. The storage compartment is connected with a hydraulic motor, and a valve allows fluid passage from the storage compartment to the hydraulic motor. An energy storage component, e.g. a battery, is connected with the hydraulic motor and is charged by the hydraulic motor when the hydraulic fluid passes through the hydraulic motor. Upon passage in the hydraulic motor, the fluid is stored in a further storage compartment and is then sent back to the area of the temperature-responsive material.

9 Claims, 4 Drawing Sheets

PHASE CHANGE MATERIAL THERMAL POWER GENERATOR

CROSS-REFERENCE TO RELATED APPLICATIONS

This application claims priority to U.S. Provisional Application 60/928,364 filed on May 9, 2007 and U.S. Provisional Application 60/998,656 filed on Oct. 12, 2007, the contents of both which are incorporated herein by reference in their entirety.

STATEMENT OF GOVERNMENT GRANT

The invention described herein was made in the performance of work under a NASA contract, and is subject to the provisions of Public Law 96-517 (35 USC 202) in which the Contractor has elected to retain title.

FIELD

The present disclosure related to power generators. In particular, it relates to a phase change material thermal power generator.

BACKGROUND

There are many thousands of ocean research buoys that presently bob up and down in the world's oceans, performing scientific research on temperature, salinity, global warming, ocean currents, and pollution. A graph of recent locations of these battery-powered buoys is shown in FIG. 1. At present, each buoy, which costs about $25K each, can travel between sea-level and about 1000 to 2000-m depths, and they are considered disposable after the batteries wear out, typically after some months of use.

There are also many gliding submersibles for the Navy and for research purposes. Each of these gliding vehicles cost about $100K, and the batteries last a period of months before these vessels are also disposed after the batteries run out. A typical gliding path is shown in FIG. 2 and may cover depths from sea level to about 700-m.

For most places in the world's temperate and tropical oceans, the temperature of the ocean at sea level (typically 15° C. to 30° C.) is significantly warmer than the ocean below about 500-m depth (typically 4° C. to 7° C.). There is a need to have a floater or glider that can use the oceans' temperature differences to generate electricity, thus allowing these submersibles to last a period of many years, instead of just months.

U.S. Pat. No. 5,291,847 discloses a submersible system that uses ocean temperature differences to supply buoyancy changes. This system uses a phase change material (PCM) that melts above 10° C. and freezes at temperatures below 10° C. The expansion upon melting causes a liquid to be compressed and stored, so that it can be released to an external bladder to create positive buoyancy when desired. Conversely, when the PCM freezes, it contracts and can accept fluid from the external bladder to cause the submersible to sink.

FIG. 3 (Jack A. Jones and Yi Chao, *Novel Thermal Powered Technology for UUV Persistant Surveillance*, Presentation to the ONR Joint Review of Unmanned Systems Technology Development, Panama City, Fla., Feb. 10, 2006, incorporated herein by reference in its entirety) shows an ocean thermal energy conversion (OTEC) system that uses hydraulic fluid from a phase change material (PCM) device, so that when the PCM compresses the liquid, it is stored in a high pressure bellows inside a pressurized nitrogen chamber. When electricity is desired, a valve is opened and the fluid pushes a piston that turns a generator to produce electricity.

In particular, PCM (10) expands when melted above 10° C., thus forcing out a hydraulic fluid (20) past a check valve (30). The hydraulic fluid (20) is then stored in a bellows (40) that is pressurized (e.g., a 200 Bar pressure) by gas in a chamber (50) external to the bellows (40).

When valve (60) is open, the hydraulic fluid (20) passes through and presses against a piston (70) that pushes geared rack and pinion teeth (80) against another set of gears (90) which will spin fast due to the gear ratio. A generator (100) is turned by the last gear in the gear train to produce power that charges a battery (110). Later, the hydraulic fluid (20) passes through valve (120) into a fixed volume chamber (130), thus allowing the piston (70) to return to its original position. When the PCM is cooled to below 10° C., it freezes and contracts, thus allowing the hydraulic, fluid to pass through check valve (140) into the volume (150) surrounding the PCM tubes (10).

The device of FIG. 3 proved to be too heavy, inefficient, complicated and expensive to fabricate. Commercially available, high-force, rack and pinion gears, as well as high-pressure pistons, as represented by (70), (80), (90), and (20) have a very large mass typically of over 15 kg. Furthermore, the required high ratio gears shown as (80), (90), and (100) typically have a very low efficiency of 0.5 or lower. Because the system has so many custom pieces that must be precisely aligned, it is both complicated and expensive to fabricate.

SUMMARY

According to a first aspect, an energy producing device is disclosed, the device comprising: a temperature-responsive material adapted to undergo density changes in response to temperature changes; a hydraulic fluid operatively associated with the temperature-responsive material, the hydraulic fluid adapted to be controlled within the energy producing device in accordance with the density changes of the temperature-responsive material; a first pressurized storage compartment configured to store the hydraulic fluid upon the density change of the temperature-responsive material; a hydraulic motor fluidically connected with the first pressurized storage compartment; a first valve adapted to allow hydraulic fluid passage from the first pressurized storage compartment to the hydraulic motor; an energy storage component connected with the hydraulic motor, the energy storage component being chargeable by the hydraulic motor upon passage of the hydraulic fluid through the hydraulic motor thus obtaining conversion of hydraulic energy to electrical energy; and a second pressurized storage compartment configured to store the hydraulic fluid after passage of the hydraulic fluid in the hydraulic motor.

Further embodiments of the present disclosure are provide in the written specification, drawings and claims of the present application.

The thermal power generator according to the disclosure may have potential application as an Ocean Thermal Energy Conversion (OTEC) device. It has quite reasonable efficiencies compared to other OTEC devices that use the temperature differences between the upper warm ocean, and cooler deeper water which is pulled up from below. This might have niche applications in the commercial electric market for remote areas.

DETAILED DESCRIPTION

In accordance with the present disclosure, a simplified system is provided with the use of a hydraulic motor to replace the piston and a generator to produce electricity.

Figure 1:
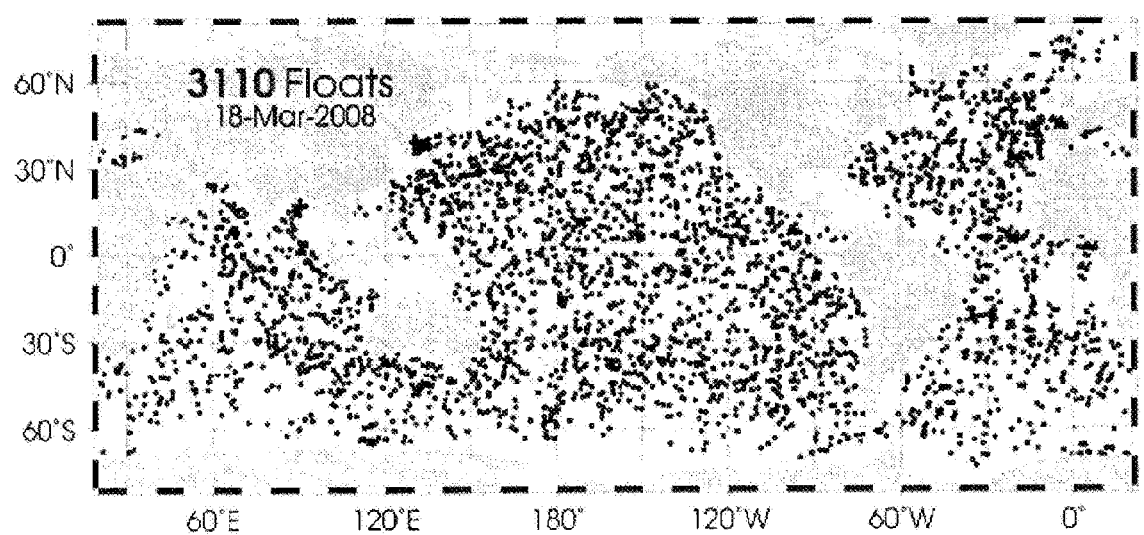
FIG. 1 shows a graph of recent locations of battery-powered buoys.
Figure 2:
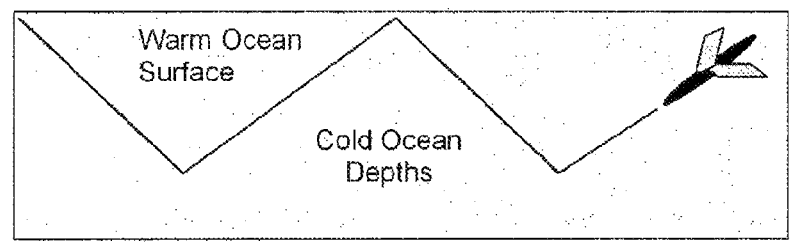
FIG. 2 shows a typical gliding path of a submersible.
Figure 3:
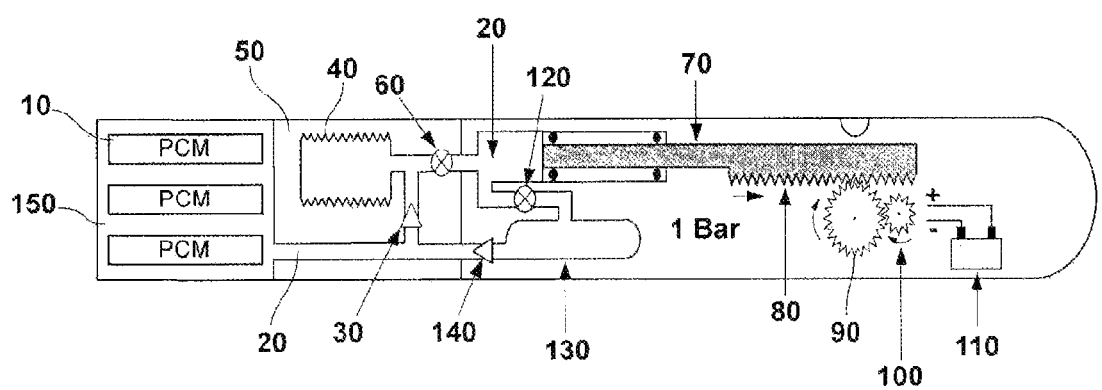
FIG. 3 shows a schematic cross-sectional view of an ocean thermal energy conversion (OTEC) system that uses hydraulic fluid from a phase change material.
Figure 4:
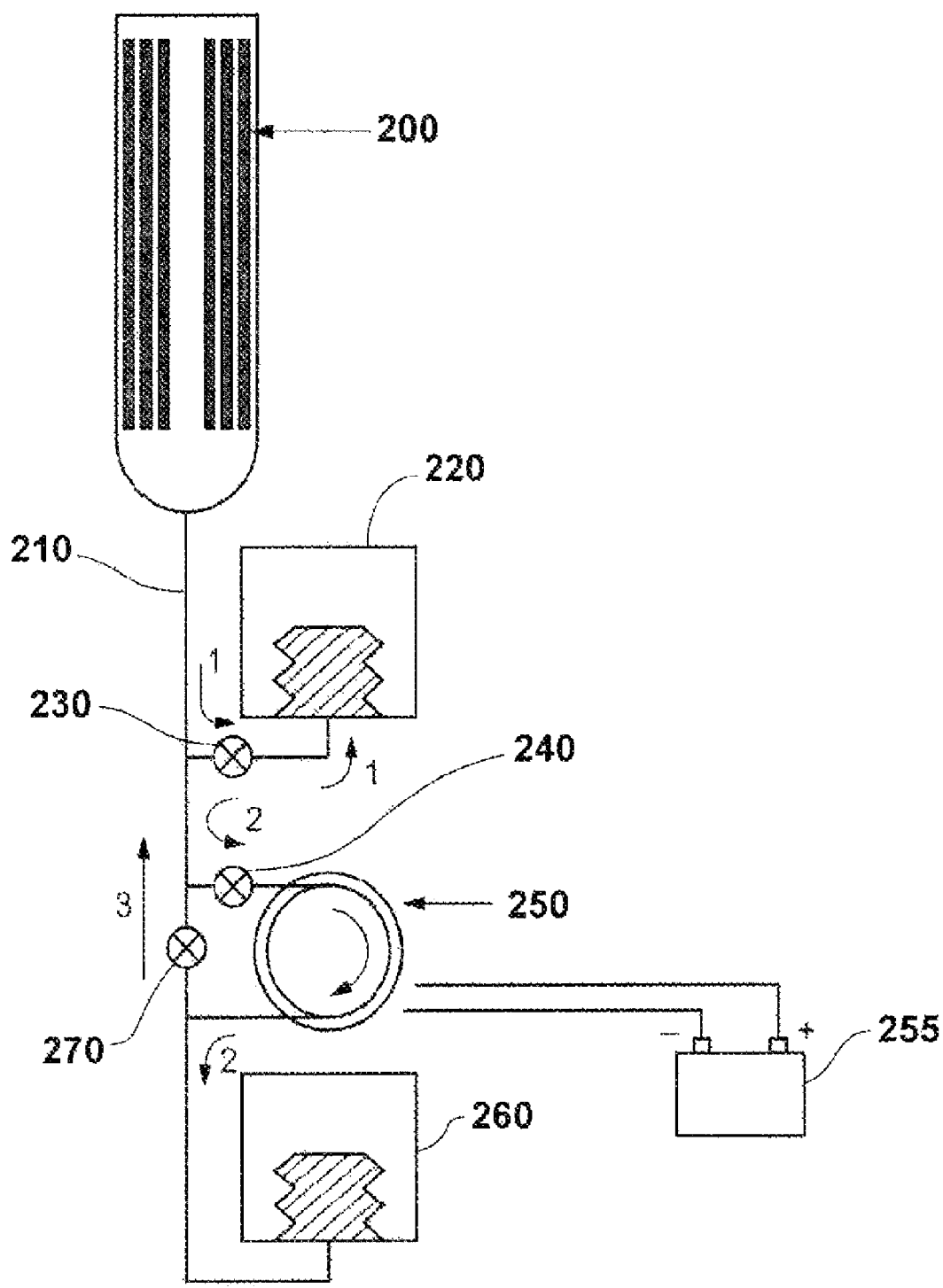
FIG. 4 shows a schematic view of a first embodiment of the system according to the present disclosure.

As shown in FIG. 4, the PCM (200) melting causes the hydraulic fluid (210) to be stored in a gas spring bellows (220) (e.g., at a pressure of 3000 psia) when the fluid is flowed past valve (230), see path 1. When power is desired, valve (240) is opened and the fluid passes through a hydraulic motor (250) (path 2), thus eliminating all the pistons and gears of FIG. 3 above, and allowing a more simple, efficient and lightweight operation and charging of battery (255).

The battery (255) can be used to power scientific measuring equipment, communications, imaging, etc. It can also be used for electrically-powered buoyancy control and for directional control equipment.

Applicants have noted that a commercially available hydraulic motor can replace the complicated components represented by (20), (70), (80), and (90) in FIG. 3. According to one of the embodiments of the present disclosure, the total mass for this portion of the system can be reduced from over 15 kg to only about 1 kg, and the total cost can be reduced from over $30,000 to only about $30, or a factor of about 1000, Furthermore, the mechanical efficiency can be increased from about 0.5 to about 0.9. A hydraulic gear motor is most suitable as a lightweight, efficient, and low cost motor, as shown by (250) in FIG. 4. After the fluid leaves the hydraulic motor (250), it is stored in a low pressure (e.g. 20 psia) spring bellows device (260) (sec also path 2), and is ultimately returned to the PCM vessel (200) when valve (270) is opened, see path 3. A typical high pressure for chamber (220) in FIG. 4 is 1000-5000 psi, and a typical low pressure chamber (260) in FIG. 4 is about 10-200 psi.

Upon reading of the above description and review of the embodiment of FIG. 4, the person skilled in the art will understand that further embodiments can be contemplated with a different location of the valves shown in FIG. 4 and with a different number of valves.

The device shown in FIG. 4 has a higher efficiency and is much less expensive, and easier to build.

Figure 5:
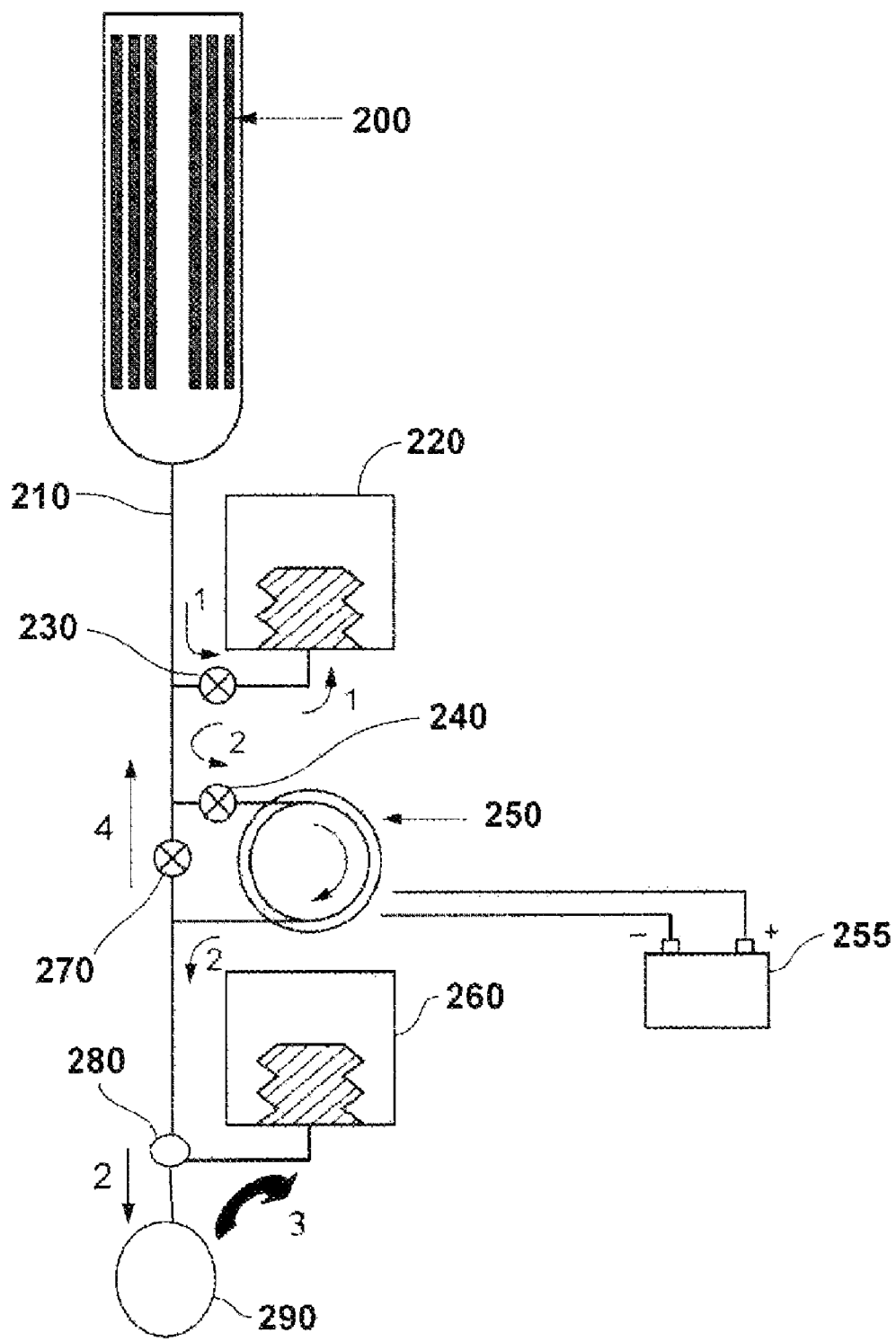
FIG. 5 shows a schematic view of a second embodiment of the system according to the present disclosure.

FIG. 5 shows a further embodiment of the present disclosure, where both electricity and buoyancy control are produced if the lower pressure fluid is vented to an external bladder at depth.

In particular, as shown in FIG. 5, when the fluid (210) leaves the hydraulic motor (250), path 2, it is allowed to pass through valve (280) into an external expandable chamber or bladder (290) on the submersible, thus causing the submersible to rise. Since the bladder (290) is external to the submersible, when it expands, more external water is displaced. According to Archimedes Principle of Buoyancy, the submersible will become more buoyant when it displaces for external water.

The same valve (280) is later used to move the fluid to the low pressure (e.g., 10 psia) gas bellows chamber (260) when descent of the submersible is desired. Ultimately, when the PCM (200) is cooled, valve (280) is again operated so that the fluid travels in path 4 back to the chamber (200). This operation allows the generation of electricity, as well as direct buoyancy change for the submersible.

Accordingly, what has been shown is a phase change material thermal power generator. While this phase change material thermal power generator has been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

In particular, the thermal power generator may be stationary, and be alternately cooled and heated by flowing water. Furthermore, the thermal power generator may create a high pressure fluid not by changing phase of a material, but rather, by virtue of density differences caused in a liquid by heating.

The invention claimed is:

1. A submersible vehicle adapted to descend or ascend to different depths within water or ocean, the submersible vehicle comprising an energy producing device, the energy product device comprising:
    a temperature-responsive material adapted to undergo density changes in response to temperature changes;
    a hydraulic fluid operatively associated with the temperature-responsive material, the hydraulic fluid adapted to be controlled within the energy producing device in accordance with the density changes of the temperature-responsive material;
    a first pressurized storage compartment configured to store the hydraulic fluid upon the density change of the temperature-responsive material;
    a hydraulic motor fluidically connected with the first pressurized storage compartment;
    a first valve adapted to allow hydraulic fluid passage from the first pressurized storage compartment to the hydraulic motor;
    an energy storage component connected with the hydraulic motor, the energy storage component being chargeable by the hydraulic motor upon passage of the hydraulic fluid through the hydraulic motor thus obtaining conversion of hydraulic energy to electrical energy; and
    a second pressurized storage compartment configured to store the hydraulic fluid after passage of the hydraulic fluid in the hydraulic motor,
    wherein the electrical energy is adapted to be used to power the submersible vehicle, the submersible vehicle further comprising a bladder external to the submersible vehicle, the bladder being connected to the second pressurized storage compartment, wherein the hydraulic fluid is adapted to be controllably fed to the bladder to control buoyancy of the submersible vehicle.

2. The submersible vehicle of claim 1, further comprising a second valve between the second pressurized storage compartment and the bladder, the second valve controlling feeding of the hydraulic fluid to the bladder and/or return of the hydraulic fluid from the second pressurized storage compartment to a region of the submersible vehicle under control of the temperature-responsive material.

3. The submersible vehicle of claim 1, wherein the density change corresponds to expansion or contraction of the temperature-responsive material.

4. The submersible vehicle of claim 1, wherein the density change corresponds to a phase change of the temperature-responsive material.

5. The submersible device of claim 1, adapted to undergo a first operative condition where the hydraulic fluid is fed to the bladder to cause the submersible device to rise, a second operative condition where the hydraulic fluid is fed from the bladder to the second pressurized storage compartment to cause the submersible device to descend, and a third operative condition where the hydraulic fluid is fed from the second pressurized storage compartment back to a region of the energy producing device under control of the temperature-responsive material.

6. The submersible device of claim 5, wherein the hydraulic fluid fed to the bladder passes through the hydraulic motor.

7. The submersible device of claim 5, wherein the hydraulic fluid fed to the bladder bypasses the hydraulic motor.

8. The submersible vehicle of claim 1, further comprising a third valve adapted to allow hydraulic fluid return from the second pressurized storage compartment to a region of the submersible vehicle under control of the temperature-responsive material.

9. The submersible vehicle of claim 1, further comprising a fourth valve adapted to prevent return of the hydraulic fluid from the first pressurized storage compartment to a region of the submersible vehicle under control of the temperature-responsive material.

* * * * *